US010464826B2

(12) United States Patent
Rajagopalan et al.

(10) Patent No.: US 10,464,826 B2
(45) Date of Patent: *Nov. 5, 2019

(54) SEMI-CONTINUOUS TREATMENT OF PRODUCED WATER WITH BOILER FLUE GAS

(71) Applicant: CONOCOPHILLIPS COMPANY, Houston, TX (US)

(72) Inventors: Suriyanarayanan Rajagopalan, Sugar Land, TX (US); Dale Embry, Houston, TX (US); Edward Latimer, Ponica City, OK (US)

(73) Assignee: ConocoPhillips Company, Houston, TX (US)

( * ) Notice: Subject to any disclaimer, the term of this patent is extended or adjusted under 35 U.S.C. 154(b) by 93 days.

This patent is subject to a terminal disclaimer.

(21) Appl. No.: 15/244,110

(22) Filed: Aug. 23, 2016

(65) Prior Publication Data

US 2017/0057835 A1    Mar. 2, 2017

Related U.S. Application Data

(60) Provisional application No. 62/210,180, filed on Aug. 26, 2015.

(51) Int. Cl.

| C02F 1/10  | (2006.01) |
| B01D 1/14  | (2006.01) |
| B01D 5/00  | (2006.01) |
| C02F 1/16  | (2006.01) |
| B01D 1/00  | (2006.01) |
| B01D 1/30  | (2006.01) |
| B01D 3/20  | (2006.01) |
| C02F 1/04  | (2006.01) |
| C02F 101/32 | (2006.01) |
| C02F 103/10 | (2006.01) |
| E21B 43/24 | (2006.01) |

(52) U.S. Cl.
CPC .............. *C02F 1/10* (2013.01); *B01D 1/0058* (2013.01); *B01D 1/14* (2013.01); *B01D 1/305* (2013.01); *B01D 3/205* (2013.01); *B01D 5/006* (2013.01); *C02F 1/048* (2013.01); *C02F 1/16* (2013.01); *C02F 2101/32* (2013.01); *C02F 2103/10* (2013.01); *E21B 43/2406* (2013.01)

(58) Field of Classification Search
CPC .......... C02F 1/16; B01D 1/0058; B01D 1/02; B01D 1/305; B01D 5/006
See application file for complete search history.

(56) References Cited

U.S. PATENT DOCUMENTS

| 4,131,507 A | * | 12/1978 | Morales .................. B01D 1/00 122/158 |
| 6,536,523 B1 | * | 3/2003 | Kresnyak ............. B01D 1/0047 166/266 |
| 7,037,430 B2 | * | 5/2006 | Donaldson ........... B01D 61/022 210/652 |

(Continued)

*Primary Examiner* — Jonathan Miller
(74) *Attorney, Agent, or Firm* — Boulware & Valoir

(57) ABSTRACT

Systems and methods utilize heated waste flue gas to treat water. The heated waste flue gas, which may come from a steam generator, bubbles through untreated water to vaporize the untreated water and separate out solids and other contaminants before subsequent condensing. The steam generator may receive resulting treated water to produce steam for injection.

10 Claims, 3 Drawing Sheets

(56) References Cited

U.S. PATENT DOCUMENTS

| | | | |
|---|---|---|---|
| 7,077,201 B2* | 7/2006 | Heins | C02F 1/04 |
| | | | 166/266 |
| 8,052,763 B2* | 11/2011 | Gallot | B01D 1/0047 |
| | | | 23/295 R |
| 8,097,128 B1* | 1/2012 | Sherry | B05B 1/308 |
| | | | 203/11 |
| 8,951,392 B2* | 2/2015 | James | B01D 1/065 |
| | | | 159/13.2 |
| 9,114,406 B2* | 8/2015 | Betzer Tsilevich | B03D 1/02 |
| 9,770,671 B2* | 9/2017 | Curlett | B01D 1/14 |
| 2010/0264068 A1 | 10/2010 | Ikebe et al. | |
| 2011/0147195 A1* | 6/2011 | Shapiro | C02F 1/16 |
| | | | 203/10 |
| 2012/0247942 A1* | 10/2012 | Curlett | B01D 1/14 |
| | | | 203/10 |
| 2013/0248454 A1 | 9/2013 | Frisk et al. | |
| 2014/0110109 A1* | 4/2014 | Latimer | F22B 1/18 |
| | | | 166/267 |
| 2014/0151296 A1 | 6/2014 | Moore et al. | |
| 2015/0096754 A1* | 4/2015 | Larkin | E21B 43/2406 |
| | | | 166/303 |
| 2016/0114260 A1* | 4/2016 | Frick | B01D 3/007 |
| | | | 203/12 |
| 2016/0258266 A1* | 9/2016 | Frick | B01D 3/007 |
| 2016/0368785 A1* | 12/2016 | Zamir | C02F 1/16 |

* cited by examiner

SEMI-CONTINUOUS TREATMENT OF PRODUCED WATER WITH BOILER FLUE GAS

PRIOR RELATED APPLICATIONS

This application is a non-provisional application which claims benefit under 35 USC § 119(e) to U.S. Provisional Application Ser. No. 62/210,180 filed Aug. 26, 2015, entitled "SEMI-CONTINUOUS TREATMENT OF PRODUCED WATER WITH BOILER FLUE GAS," which is incorporated herein in its entirety.

FIELD OF THE DISCLOSURE

The invention relates to treatment methods for water, particularly produced water from oil fields.

BACKGROUND OF THE DISCLOSURE

The effective production of hydrocarbon reservoirs containing heavy oils or unconventional oils presents significant challenges. Extraction of these high viscosity hydrocarbons is difficult due to their relative immobility at reservoir temperature and pressure. These properties make it difficult to simply pump the unconventional oil out of the ground. Such hydrocarbons may be quite thick and have a consistency similar to that of peanut butter or heavy tars, making their extraction from reservoirs difficult.

Enhanced oil recovery processes employ thermal methods to improve the recovery of heavy oils from sub-surface reservoirs. The injection of steam into heavy oil bearing formations is a widely practiced enhanced oil recovery method. Typically, several metric tons of steam are required for each metric ton of oil recovered.

Traditionally, heavy oil recovery operations have utilized "once through" type steam generators. The steam or a steam-water mixture is injected via injection wells to fluidize the heavy oil. Different percentages of water and steam can be injected into the injection wells, depending on a variety of factors including the expected output of oil and the economics of injecting different water/steam mixtures.

Injected steam heats the oil in the reservoir, which reduces the viscosity of the oil and allows the oil to flow to a collection well. After the steam fully condenses and mixes with the oil, and is then produced, it is classified as "produced water." The mixture of oil and produced water that flows to the production well is pumped to the surface. Oil is then separated from the produced water by conventional processes employed in conventional oil recovery operations.

For economic and environmental reasons, it is desirable to recycle produced water as much as possible. The produced water stream, after separation from the oil, is further de-oiled, and is treated for reuse. Most commonly, the water is sent to the "once-through" steam generators for creation of more steam for oil recovery operations.

Many patents and patent applications are directed to methods for treating produced water, including US20130248454, US20100264068, and US20140151296. However, currently known and utilized methods for treating heavy oil field produced waters in order to generate high quality steam for down-hole are not entirely satisfactory for a few reasons:

most physical chemical treatment systems are quite extensive, are relatively difficult to maintain, and require significant operator attention;

treatment systems require large amounts of expensive chemicals, many of which require special attention for safe handling, and which present safety hazards if mishandled as well as environmental hazards; and, a large quantity of unusable hot water is created, and the energy from such water must be recovered, as well as the water itself, in order to maintain an economic heat and material balance in operations.

Many attempts have been made to overcome these issues. There exists a need for a quick and cost effect means of treating produced water for reuse or disposal. Ideally, the treatment will not require expensive equipment or treatment systems, require large amounts of chemicals, increase energy consumption, or waste energy.

SUMMARY OF THE DISCLOSURE

The present disclosure describes a system and method for utilizing waste heat energy from flue gas to vaporize untreated water for use in enhanced oil recovery techniques. The vaporization occurs in a contacting vessel that is run in a semi-continuous mode allowing for scheduled maintenance and repair between one or more batches.

"Semi-continuous" as used herein means to run continuously until a maximum level of contaminants or sediment in the vessel water is reached at which time the contents are purged and the vessel refilled with untreated water. For example, acidic components in the flue gas such as $CO_2$ and sulfur contaminants will increase the pH of the water in the vessel to the point where upgraded metallurgy would be required to reduce corrosion. The purge cycle could be optimized to be as long as possible and still allow the use of lower alloy metallurgy, thus reducing the cost of the system, while allowing pH control.

In another embodiment, the process could run continuously if the contacting vessel is fitted with equipment for a purge or blowdown stream. The amount of purge could be optimized as noted above to keep the contaminants or water acidity below certain levels. A slurry or sediment removal device such as a mechanical rake or water jet system might also be employed at the bottom of the vessel. In other embodiments, a filtration system is provided to remove sediment and is coupled with a purge or blowdown system to continuously remove soluble salts, thus allowing a control of the salinity of the recirculated water, and this could be used in place of a slurry or sediment removal device.

Flue gas exiting a furnace, such as a Once Through Steam Generator (OTSG), typically has a temperature range between 170° C. and 240° C. The present system utilizes this heated flue gas to treat untreated water, particularly produced water, to remove solids and sediments. The OTSG exiting flue gas has enough heat to vaporize water, thus separating out most dissolved solids and suspended solids in the untreated water stream.

Specifically, heated flue gas exiting an OTSG is introduced into the bottom of a contacting vessel containing produced water and bubbled through the produced water, thus vaporizing the water in a semi-continuous mode. A water spray tower, wetted wall column, or packed tower can be used for the flue gas water contacting. The packed tower or wetted wall column would have some advantage in that the pressure drop through the system would be much smaller and would require less power to compress the flue gas or the burner feed gas.

The bottom of the contacting vessel containing the produced water may have a distributor plate fitted with bubble caps. A bubble cap, shown in FIG. 1, is commonly used in industrial distillation columns to promote formation of vapor bubbles flowing through a layer of liquid. The cap is mounted so that there is a space between the riser and the cap to allow the passage of vapor. Vapor rises through the riser and is directed downward by the cap, finally discharging through slots in the cap, and finally bubbling through the liquid on the tray.

The use of gas redistributors at various elevations in the vessel would allow for better contact and heat transfer of the flue gas with the untreated water. A person skilled in the art could easily design a system for optimal contact, balancing the cost of redistributors versus more efficient heat transfer.

The top of the contacting vessel containing the produced water may have a demister pad to collect any solids that may leave with the gas. Solids and any sediments remaining at the bottom of the contacting vessel can be removed between batches or by a periodic water wash spray. Because the flue gas may need to be shutdown during removal, some embodiments of the present system utilize two or more contacting vessels allowing for at least one contacting vessel to remain active while the other undergoes removal of solids and sediments.

During the normal course of bubbling gases through the bed, it may be difficult for sediments to settle at the bottom of the contacting vessel. However, after repeated batches of water have been processed with no downtime, enough sediment slurry should form at the bottom such that it can be drained.

The overhead gas leaving the vessel will be a mixture of water vapor and the non-condensable constituents of flue gas. This mixture can be cooled using a condenser and then sent to a knockout pot where flue gas would be vented from the top and the treated produced water, significantly reduced in contaminants and solids, would be removed from at or near the bottom. Sources for the cooling water to the condenser include utility cooling water, but heat recovery is possible by pre-heating glycol for a heated glycol system that is commonly used in SAGD operations or the use of any other stream where the heat from condensing water vapor could be utilized. Another option is to use an air cooler, commonly known as a fin-fan, which would eliminate the need for utility cooling water.

In one embodiment of the system, a double-effect evaporator may be used to condense the water. This would increase the equipment cost, but calculations show that the water recovered would increase from treating 9% of the water requirement for a typical SAGD facility, attained from using a single condenser, to 17%. It is also possible to use more than two evaporators, or a multi-effect evaporator, to supply even higher percentages of the SAGD water requirement though the number of stages must be balanced economically with the cost of the added equipment.

In another embodiment, the treated water produced from this process is low enough in contaminants to meet the specifications for a higher efficiency boiler such as a conventional drum boiler. This would reduce the cost of boiler fuel gas for the oil recovery operation.

In another embodiment, the vented flue gas from the knock-out pot could be used for low-value heating applications such as building heat, hot water generation, or glycol system pre-heating.

If necessary, both the vented flue gas and treated produced water streams can be further treated to be compliant with regulations and/or can be reused. Any untreated water stream with contaminants and/or solids can be treated in the present system, including feedwater, brackish water and produced water. After treatment by the present system, the treated water can undergo additional processing and treatment if desired.

The benefit of the herein described system is the ability to clean produced water using heat energy that would otherwise be wasted. While additional treatment methods can follow the present system, the present system and method itself does not require large amounts of chemicals. Further, no expensive specialty equipment is needed for the present system.

In one embodiment of the present disclosure, a contacting vessel with a bubble cap tray located at the bottom of the vessel and a demister located at the top of the vessel is filled with untreated water. Heated waste flue gas generated by a furnace is introduced into the bottom of the contacting vessel and bubbled through the untreated water to vaporize the water, leaving behind most if not all the solids and contaminants. Any remaining solids are collected by the demister or settled at the bottom of the contacting vessel for later removal. The flue gas/vaporized water are removed from the contacting vessel, condensed and separated into a treated water stream and a waste gas stream.

A variation of the above embodiment is a system containing two or more contacting vessels wherein the operation of the contacting vessels are staggered to allow for removal of solids and sedimentation from at least one contacting vessel while the remaining vessel continues to treat water.

In another embodiment, heated flue gas, generated by a furnace, is bubbled through untreated water in a contacting vessel to vaporize some or all of the untreated water. The contaminants are removed as solids by a demister located above the untreated water level or removed from the bottom of the vessel as sedimentation. The flue gas/vaporized water are removed from the contacting vessel, condensed and separated into a treated water stream and a waste gas stream.

Another embodiment is a method for removing contaminations and solids from an untreated water stream comprising bubbling heated waste flue gas through the untreated water in a contacting vessel to vaporize the water and remove the solids and other contaminants. The vaporized water and flue gas are removed from the contacting vessel, leaving solids, sediments, and residue in the contacting vessel. The vaporized water is condensed in a condenser and separated from the waste flue gas to create a treated water stream and a waste gas stream. The treated water stream can be removed from the condenser and undergo additional treatment for use in other processes. The waste gas stream can also be treated to meet federally regulated requirements for release.

In some embodiments, the treated water is reused in a steam generator to produce steam for enhanced oil recovery. Alternatively, the treated water can be otherwise handled or disposed of.

Yet another embodiment is a method for generating steam for enhanced oil recovery techniques using a furnace. Contaminants and solids are removed from untreated water by bubbling heated waste flue gas from the furnace through the untreated water in a contacting vessel to vaporize the water and remove the solids and other contaminants. The vaporized water and flue gas are removed from the contacting vessel, leaving solids, sediments, and residue in the contacting vessel. The vaporized water is condensed in a condenser (or it can cool and condense in an un-insulated pipe or holding tank) and separated from the waste flue gas to create a treated water stream and a waste gas stream. Alternatively, the steam can be collected and injected into a reservoir if temperature and pressure are sufficiently high, and if not additional heat and pressure can be added. The waste flue gas can undergo additional separation methods to remove residual water. The treated water stream from both the condenser and the additional separation methods is then introduced into the furnace for steam generation.

This summary is provided to introduce a selection of concepts that are further described below in the detailed description. This summary is not intended to identify key or essential features of the claimed subject matter, nor is it intended to be used as an aid in limiting the scope of the claimed subject matter.

The terms "semi-continuous" process as used herein means to fill the process vessel with water, untreated or otherwise, and run continuously until the level contaminants in the vessel necessitates stopping the water flow and emptying the vessel contents, and then repeating the cycle.

A "continuous" process as used herein means that at least two vessels are provided, such that one can be in used while the other is undergoing a purge cycle.

The term "untreated water" encompasses all produced or other water used for SAGD that has not undergone significant pretreatment to e.g., remove dissolved solids before being heated and includes sources such as feedwater, brackish water and water recovered from a production fluid.

The term "produced water" is used herein to describe water that is produced as a byproduct along with oil and gas. This water must be separated from oil and otherwise cleaned or treated before is can be reused or disposed of.

The terms "treated water" and "produced water free of contaminants and solids" are used interchangeable herein and refer to water that has undergone treatment using the embodiments described in this disclosure.

The term "contacting vessel" refers to the vessel wherein the untreated water and boiler flue gas are brought into contact with each other.

By "SAGD" herein we mean any of the varying steam assisted gravity drainage methods that uses steam and gravity at least in part to mobilize and collect oil, including expanding solvent SAGD, gas push SAGD, RF assisted SAGD, single well SAGD, cross SAGD, fishbone SAGD, radial SAGD, and the like.

The use of the word "a" or "an" when used in conjunction with the term "comprising" in the claims or the specification means one or more than one, unless the context dictates otherwise.

The term "about" means the stated value plus or minus the margin of error of measurement or plus or minus 10% if no method of measurement is indicated.

The use of the term "or" in the claims is used to mean "and/or" unless explicitly indicated to refer to alternatives only or if the alternatives are mutually exclusive.

The terms "comprise", "have", "include" and "contain" (and their variants) are open-ended linking verbs and allow the addition of other elements when used in a claim.

The phrase "consisting" of is closed, and excludes all additional elements.

The phrase "consisting essentially of" excludes additional material elements, but allows the inclusions of non-material elements that do not substantially change the nature of the invention.

The following abbreviations are used herein:

| ABBREVIATION | TERM |
| --- | --- |
| OTSG | Once-through steam generator |
| SAGD | Steam assisted gravity drainage |
| KO drum | Knock out drum |
| ATM | atmosphere |

DETAILED DESCRIPTION OF THE DISCLOSURE

A novel system and method for treating water on an oil pad is disclosed. Waste flue gas from, e.g., a once-through steam generator is used to vaporize untreated water in a contacting vessel. Un-vaporized solids and sediments remain in the contact vessel, and the vapor routed as needed.

Figure 1:
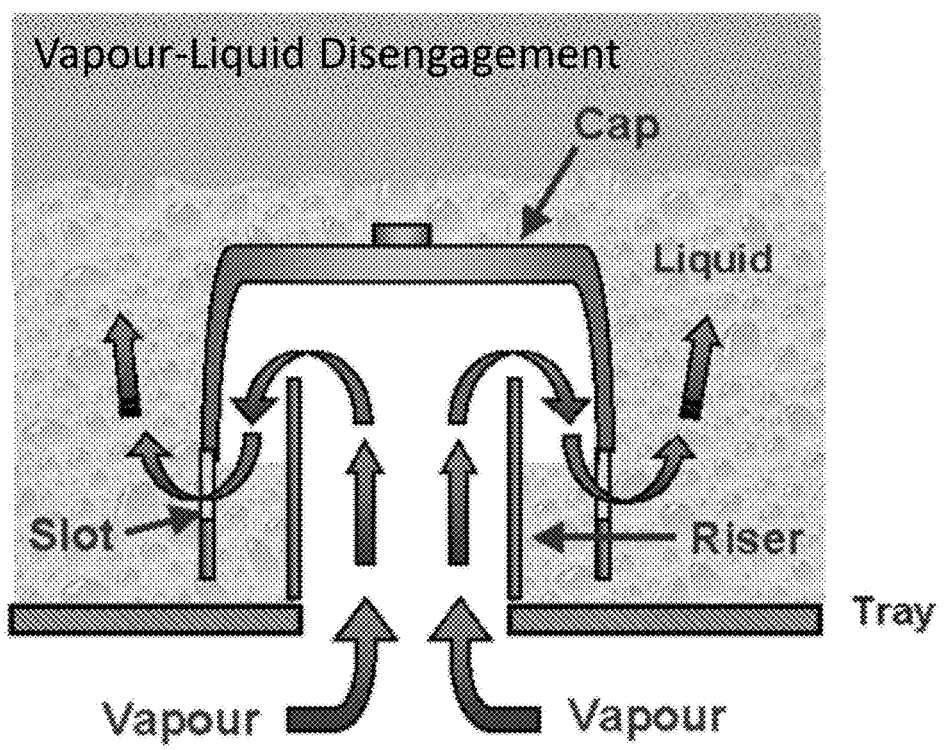
FIG. 1. displays a bubble cap.
Figure 2:
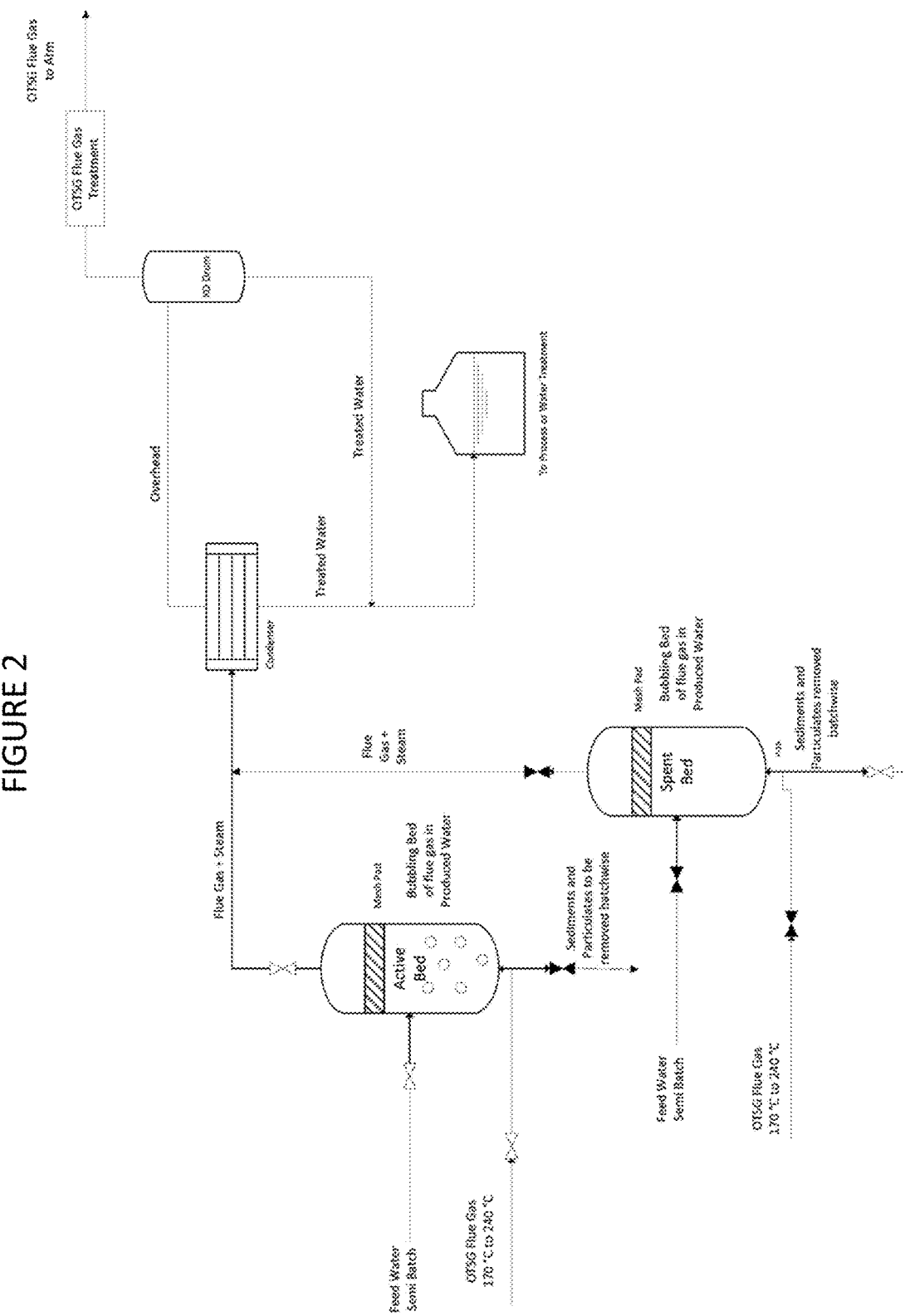
FIG. 2. displays a block flow diagram of one embodiment of the described system for vaporizing untreated water using waste flue gas.

One embodiment of the presently disclosed system is shown in FIG. 2. In this system, heated flue gas from an OTSG is introduced into one or more contacting vessels having a batch of untreated water. The flue gas has a temperature range of at least 170° C. to 240° C., which is high enough to vaporize water to form steam.

Figure 3:
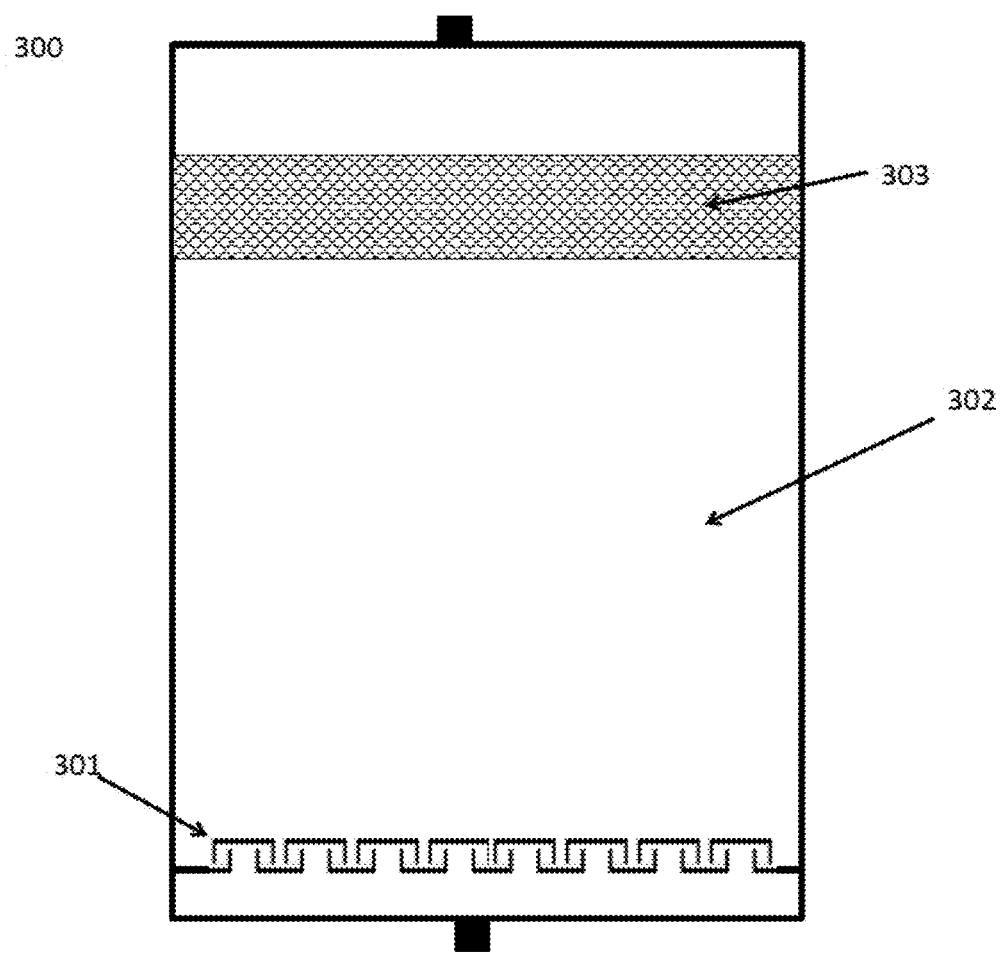
FIG. 3. displays a contacting vessel according to one embodiment of the system.

The contacting vessel is shown in more detail in FIG. 3. The bottom of the contacting vessel 300 has a distributor plate fitted with bubble caps 301. Heated flue gas rises through the bubble caps to bubbling through the untreated water in the contacting area 302 of the contacting vessel 300, resulting in the vaporization of the untreated water.

As the flue gas and steam rise to the top of the contacting vessel, they move through a demister 303 located above the water line, which traps solids still in the vaporized water. Most contaminants and solids do not rise with the gases and remain in the lower section of the contact vessel below the demister. Eventually, the contaminants and solids in this lower section will settle to the bottom of the contacting vessel forming sediment. In many cases, multiple batches of water processing are necessary before the sediment slurry will have to be removed from the contacting vessel or demister.

In FIG. 2, two contacting vessels are shown with one being "active" and the other "spent". By using more than one contacting vessel, the system is able to continuously treat water while one contacting vessel has the sediments and particulates removed. Thus, the "active" bed is bubbling heated flue gas through a batch of untreated water while no flue gas is entering the "spent" bed as it waits for sediments and particulates to be drained and removed. Fluid lines and valving are used to ensure correct fluid flow for the two-unit system, shunting untreated water and flue gas from the first vessel to the second vessel before a purge cycle in the first vessel begins. When the second vessel needs purging, valving again shunts untreated water and flue gas back to the first vessel. Steam collected from the top of either vessel can be collected by single line with single demister, condenser, knock-out pot, etc., thus saving on capital costs, although this is not essential.

The flue gas and steam exit the top of the contacting vessel and are introduced into a condenser, which will condense the steam to produce a treated, contaminant free stream. This allows the overhead flue gas to exit the top of the condenser while the treated water is removed from the bottom via a knockout plug.

Alternatively, the steam can be fed back into the steam generation system, further heated if needed, and be reused for injection into the reservoir.

The overhead flue gas can be further treated by flowing through a knock-out drum to remove any water not removed in the condenser. The flue gas can then undergo additional treatments to meet federal regulations for atmospheric release, or be otherwise handled.

Any untreated water can be treated by the present system and method, including feedwater, brackish water and/or produced water. In some embodiments, only produced water is treated after it has been separated from the recovered hydrocarbon stream and de-oiled. In other embodiments, the produced water is combined with e.g. feedwater or makeup water before treatment.

The benefit of the described system is the ability to clean produced water using heat energy that would otherwise be wasted. This will improve the cost balance of an enhanced oil recovery operation.

The disclosed system and methods comprises one or more of the following embodiments, in any combination thereof.

In one embodiment, a water treatment system is described where a heated flue gas stream is generated by a furnace; an untreated water stream; at least one contacting vessel for generating a steam and flue gas stream, said contacting vessel having a top and bottom wherein the bottom has a heated flue gas inlet and a bubbling cap tray above said heated flue gas inlet and the top has a steam and flue gas stream outlet and a demister tray, and said contacting vessel having an inlet for said untreated water steam; a condenser in fluid communication with said at least one contacting vessel and having a steam and flue gas inlet, wherein said condenser has a first treated water outlet and a overhead flue gas outlet; and a knock out drum in fluid communication with said condenser and having an inlet for overhead flue gas and an outlet for flue gas and a second treated water outlet, wherein said treated water from said condenser and knock drum are combined.

A system for generating steam for enhanced oil recovery, comprising:
a. a furnace for generating a heated flue gas stream and a steam stream;
b. an untreated water stream;
c. at least one contacting vessel for generating a steam and flue gas stream, said contacting vessel having a top and bottom wherein the bottom has a heated flue gas inlet and a bubbling cap tray above said heated flue gas inlet and the top has a steam and flue gas stream outlet and a demister tray, and said contacting vessel having an inlet for said untreated water steam;
d. a condenser in fluid communication with said at least one contacting vessel and having a steam and flue gas inlet, wherein said condenser has a first treated water outlet and a overhead flue gas outlet; and
e. a knock out drum in fluid communication with said condenser and having an inlet for overhead flue gas and an outlet for flue gas and a second treated water outlet,
f. wherein said treated water from said condenser and knock drum are combined and introduced into said furnace; and
g. said steam is injected into a reservoir for enhanced oil recovery.

A steam generating system for enhanced oil recovery, with a furnace for generating a heated flue gas stream and a steam stream, where the steam stream injected into a heavy oil reservoir to mobilize heavy oil, may be improved by:
a. a furnace for generating a heated flue gas stream and a steam stream;
b. an untreated water stream;
c. at least one contacting vessel for receiving said steam stream and said flue gas stream, said contacting vessel having a top and bottom wherein the bottom has an inlet for said heated flue gas stream and a bubbling cap tray above said heated flue gas inlet and the top has a steam and flue gas stream outlet and a demister tray, and said contacting vessel having an inlet for said untreated water steam;
d. a condenser in fluid communication with said at least one contacting vessel and having a steam and flue gas inlet, wherein said condenser has a first treated water outlet and a overhead flue gas outlet; and
e. a knock out drum in fluid communication with said condenser and having an inlet for overhead flue gas and an outlet for flue gas and a second treated water outlet,
f. wherein said treated water from said condenser and knock drum are combined and introduced into said furnace to be converted into steam; and
g. wherein said steam is injected into a heavy oil reservoir to mobilize heavy oil.

Water may be treated using waste flue gas including:
a. admitting a batch of untreated water into a contacting vessel, wherein said contacting vessel has bubble cap tray and a demister;
b. passing a heated waste flue gas stream through said bubble cap tray;
c. bubbling said heated waste flue gas through said batch of untreated water;
d. vaporizing said batch of untreated water with said heated waste flue gas to create steam;
e. flowing said heated waste flue gas and said stream through said demister to remove solids;
f. condensing said heated waste flue gas and said stream in a condenser to form a gas stream and a condensed water stream;
g. separating said gas stream and said first treated water stream;
h. passing said gas stream through a knock out drum to remove residual water;
i. combining said residual water and said condensed water stream to form a treated water.

Steam may be generated for enhanced oil recovery techniques by
a. admitting a batch of untreated water into a contacting vessel, wherein said contacting vessel has bubble cap tray and a demister;
b. passing a heated waste flue gas stream through said bubble cap tray;
c. bubbling said heated waste flue gas through said batch of untreated water;
d. vaporizing said batch of untreated water with said heated waste flue gas to create steam;
e. flowing said heated waste flue gas and said stream through said demister to remove solids;
f. condensing said heated waste flue gas and said stream in a condenser to form a gas stream and a condensed water stream;

g. separating said gas stream and said first treated water stream;
h. passing said gas stream through a knock out drum to remove residual water;
i. combining said residual water and said condensed water stream to form a treated water;
j. heating said treated water in a furnace to generate a steam for enhanced oil recovery and a waste flue gas, wherein said waste flue gas is used in step b.

Produced water may be treated using waste flue gas by
a. admitting a batch of untreated produced water into a contacting vessel, wherein said contacting vessel has bubble cap tray and a demister;
b. passing a heated waste flue gas stream through said bubble cap tray;
c. bubbling said heated waste flue gas through said batch of untreated produced water;
d. vaporizing said batch of untreated produced water with said heated waste flue gas to create steam;
e. flowing said heated waste flue gas and said stream through said demister to remove solids;
f. condensing said heated waste flue gas and said stream in a condenser to form a gas stream and a condensed water stream;
g. separating said gas stream and said first treated water stream;
h. passing said gas stream through a knock out drum to remove residual water;
i. combining said residual water and said condensed water stream to form a treated produced water.

A improved steam generating system for SAGD, said steam generating system comprising a furnace for generating a heated flue gas stream and a steam stream used for SAGD, said improvement comprising using said heated flue gas stream to vaporize a produced water into steam and solids, separating said steam and solids, recondensing said steam to clean water and reusing said clean water in said furnace to make steam for SAGD.

The heated flue gas stream may have a temperature between 170° C. and 240° C.

The untreated water stream may be feedwater, brackish water and/or produced water. In one embodiment, the untreated water stream is produced water.

The water treatment may include a first and second contacting vessels, each in fluid communication with said condenser, and valving provided so that said first contacting vessel can be cleaned while said second contracting vessel can be used for generating a steam and flue gas stream.

The combined treated water may undergo additional treatment.

The flue gas may undergo additional treatment. Heated flue gas may be heated flue gas is generated by a once-through steam generator.

The contacting vessel may be a water spray tower, a wetted wall column, or a packed tower.

In another embodiment, two contacting vessels are operated sequentially, such that one can be in use while the other is being cleaned, which may include removing solids from a demister in a contacting vessel.

The treated water may be introduced into a steam generator for an enhanced oil recovery technique. Enhanced oil recovery techniques may include steam assisted gravity drainage ("SAGD").

The present invention is exemplified with respect to produced water. However, this is exemplary only, and the system can be broadly applied to other untreated water having solids. The following examples are intended to be illustrative only, and not unduly limit the scope of the appended claims.

The invention claimed is:
1. A method of generating steam for enhanced oil recovery techniques, comprising:
   a) admitting a batch of untreated water into a contacting vessel, wherein said contacting vessel has a bubble cap tray and a demister;
   b) bubbling heated waste flue gas from a steam generator through said bubble cap tray and through the batch of untreated water;
   c) vaporizing the batch of untreated water with the heated waste flue gas to create intermediate steam;
   d) condensing the intermediate steam mixed with the heated waste flue gas in a condenser to form a gas stream and a treated water stream;
   e) heating the treated water stream in the steam generator to produce injection steam for enhanced oil recovery and the heated waste flue gas that is bubbled through the batch of untreated water in step b); and
   f) removing sediments from the contacting vessel;
   wherein two contacting vessels are operated sequentially, such that one can be in use while the other is being cleaned in step f).

2. The method of claim 1, wherein the heated waste flue gas has a temperature between 170° C. and 240° C.

3. The method of claim 1, wherein the steam generator is a once-through steam generator.

4. The method of claim 1, wherein the enhanced oil recovery technique comprises steam assisted gravity drainage.

5. The method of claim 1, wherein the untreated water is at least one of feedwater, brackish water and produced water.

6. The method of claim 1, wherein the untreated water is produced water.

7. A method of treating produced water using waste flue gas comprising:
   admitting a batch of untreated produced water into a contacting vessel wherein the contacting vessel has a bubble cap tray through which the heated waste flue gas is passed and a demister;
   bubbling heated waste flue gas from a steam generator through said bubble cap tray and through the batch of untreated produced water;
   vaporizing the batch of untreated produced water with the heated waste flue gas to create steam;
   removing solids from the steam with said demister;
   condensing the steam in a condenser to form a gas stream and a treated water stream; and
   separating the gas stream and the treated water stream;
   wherein two contacting vessels are operated sequentially, such that one can be in use while the other is being cleaned of solids in said demister and said contacting vessel.

8. The method of claim 7, wherein the heated flue gas has a temperature between 170° C. and 240° C.

9. The method of claim 7, wherein the heated flue gas is generated by a once-through steam generator.

10. The method of claim 7, wherein all of the steam from the contacting vessel is condensed to form the treated water.

* * * * *